(12) United States Patent
Robertson

(10) Patent No.: US 6,619,237 B2
(45) Date of Patent: Sep. 16, 2003

(54) RECOVERABLE CAT-SCRATCHING POST

(76) Inventor: Nita J. Robertson, 25 Westwind #1, Marina Del Rey, CA (US) 90292

(*) Notice: Subject to any disclaimer, the term of this patent is extended or adjusted under 35 U.S.C. 154(b) by 0 days.

(21) Appl. No.: 10/173,870

(22) Filed: Jun. 18, 2002

(65) Prior Publication Data

US 2002/0195064 A1 Dec. 26, 2002

Related U.S. Application Data

(60) Provisional application No. 60/299,974, filed on Jun. 22, 2001.

(51) Int. Cl.⁷ .............................................. A01K 13/00
(52) U.S. Cl. ....................................... 119/706; 119/707
(58) Field of Search ................................ 119/706, 707, 119/702, 656; D30/160

(56) References Cited

U.S. PATENT DOCUMENTS

| | | | | |
|---|---|---|---|---|
| 2,005,817 A | * | 6/1935 | Yoder | 119/657 |
| 2,888,906 A | * | 6/1959 | Delp | 119/656 |
| 2,997,019 A | * | 8/1961 | Bryson | 119/706 |
| 3,144,375 A | * | 8/1964 | Day | |
| D224,686 S | * | 8/1972 | Michlap | 119/28.5 |
| 3,993,027 A | | 11/1976 | Mullin | |
| 4,047,502 A | * | 9/1977 | Gordon, Jr. | 119/706 |
| 4,177,763 A | * | 12/1979 | Cook | 119/706 |
| D255,610 S | * | 6/1980 | Clarke-Fodor | 119/706 |
| 4,253,423 A | * | 3/1981 | Kaplan | 119/706 |
| 4,517,922 A | * | 5/1985 | Lind | 119/708 |
| 4,790,265 A | | 12/1988 | Manson | |
| 4,996,946 A | * | 3/1991 | Olson | 119/706 |
| 5,113,795 A | * | 5/1992 | Delzio | 119/51.01 |
| D336,557 S | * | 6/1993 | Wade | D30/160 |
| 5,320,065 A | | 6/1994 | Leopold | |
| D370,093 S | * | 5/1996 | DeLuca | 119/706 |
| 5,540,186 A | * | 7/1996 | Udelle | 119/609 |
| 5,577,466 A | | 11/1996 | Luxford | |
| 5,595,141 A | * | 1/1997 | Udelle et al. | 119/706 |
| 5,680,831 A | * | 10/1997 | Udelle | 119/609 |
| 5,806,464 A | * | 9/1998 | Willinger et al. | 119/706 |
| 5,842,440 A | * | 12/1998 | Bell, Jr. | 119/612 |
| 6,058,887 A | * | 5/2000 | Silverman | 119/609 |
| D444,600 S | * | 7/2001 | Spritzer | D30/160 |
| 6,343,569 B1 | * | 2/2002 | Buendiger | 119/706 |
| 6,345,593 B1 | * | 2/2002 | Stewart et al. | 119/706 |
| 6,378,463 B1 | * | 4/2002 | Simmons | 119/707 |

* cited by examiner

Primary Examiner—Yvonne Abbott
(74) Attorney, Agent, or Firm—Kelly Bauersfeld Lowry & Kelley, LLP

(57) ABSTRACT

A cat scratching apparatus includes a base and post and utilizes removable, cat scratching covers. A base anchor attaches to the base and supports the vertically extending post. A plug fits in a top of the post. A post cover wraps around sides of the post and has interfitting teeth and grooves for folding over the top of the post and covering the plug. A base cover folds over sides of the base and attaches to an underside of the base. The base cover also has a hole allowing the post to pass through. The covers are made of a cat-scratchable material, substantially cover the entire base and post, and are removed, discarded, and replaced at the end of their useful lives. The base and post are not discarded and are continually reused.

18 Claims, 3 Drawing Sheets

RECOVERABLE CAT-SCRATCHING POST

RELATED APPLICATION

This application claims priority from provisional application Ser. No. 60/299,974 filed Jun. 22, 2001.

BACKGROUND OF THE INVENTION

The present invention relates generally to scratching posts that household pets can scratch instead of furniture. More particularly, the present invention relates to a cat-scratching post having a disposable cover which may be thrown away at the end of its useful life, and easily replaced with a new cover, thereby eliminating the need to throw away the entire scratching assembly when only the cover is at the end of its useful life.

A number of different types of cat-scratching devices have been patented and are currently available on the market. Many of these devices include a base and a post, wrapped in a carpet-like cover meant to be scratched by a housecat. Since the cover associated with these devices is not designed to be removed and replaced with a new cover, once the cover wears out the entire scratching assembly must be replaced. This is a serious drawback inherent in currently-available scratching devices for at least the following reasons: (1) replacing the entire scratching assembly is substantially more costly than replacing the cover only; (2) throwing away an entire scratching assembly when only the cover needs replacing is wasteful and contributes to waste-disposal problems; (3) purchasing and transporting an entire scratching assembly from the store to the home is inconvenient compared to purchasing and transporting the much less bulky covers only; and (4) since cat owners are far more likely to keep spare covers in the house than they are to keep entire spare scratching assemblies, replacing the entire scratching assembly necessitates more trips to the pet store than replacing the covers alone would.

Accordingly, there is a need for a cat-scratching device that utilizes easily-replaceable, removable covers, thereby accomplishing the following: allowing the underlying base-and-post assembly itself to be preserved for continuing use; helping alleviate waste-disposal problems by generating less waste; eliminating the need to regularly purchase and transport entire bulky scratching assemblies; and decreasing the number of required trips to the pet store by allowing pet owners the option of keeping several spare covers at home. The present invention fulfills these needs and provides other related advantages.

SUMMARY OF THE INVENTION

The present invention resides in a cat scratching apparatus having an underlying base and post, and removable covers which may be replaced at the end of their useful life, thereby eliminating the need to dispose of the entire cat scratching apparatus when the covers alone reach the end of their useful life.

The apparatus includes a base and a base anchor attached to an upper face of the base. A cat-scratchable base cover removably attaches to and substantially covers the base. The base cover generally has hook-and-loop tape affixed thereto, and wraps around base sides, attaching to corresponding hook-and-loop tape affixed to an underside of the base. The base cover also contains a hole through which the post extends.

The post removably attaches to the base. Typically, the post attaches by sliding down over the base anchor. A plug fits into a top of the post and serves as a cap. A cat-scratchable post cover removably attaches to and substantially covers the post. The post cover generally has hook-and-loop tape affixed thereto, and attaches to corresponding hook-and-loop tape affixed to the post. Preferably, the post cover has an edge shaped into teeth and grooves that fold over the top of the post and interfit with one another to cover the plug.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
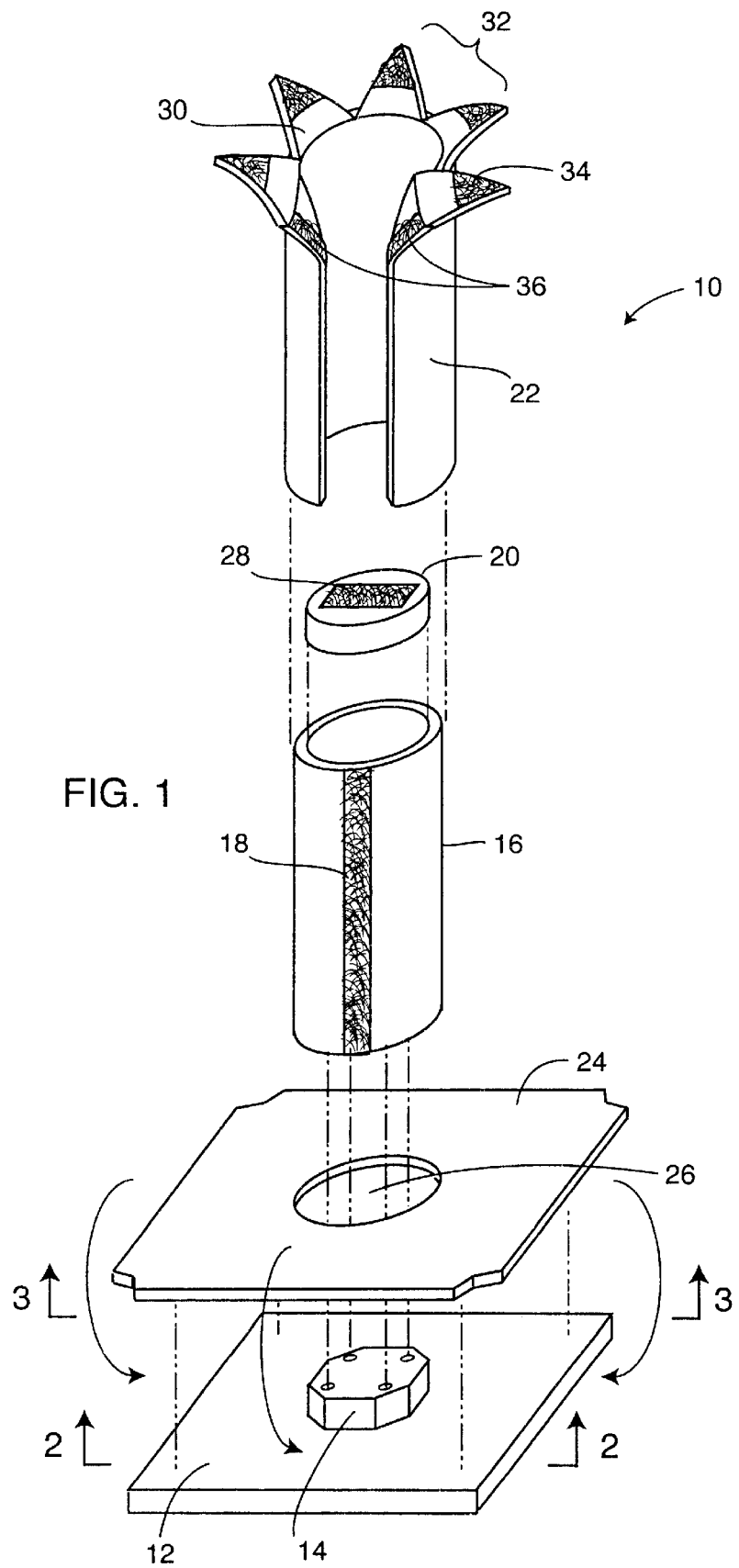
FIG. 1 is a partially-exploded view of the preferred embodiment of the present invention, illustrating general components including a base, a base anchor, cat-scratchable base and post covers, a post, and a plug.

As shown in the drawings for purposes of illustration, the present invention resides in a cat scratching apparatus having removable and disposable cat-scratchable covers, and is generally referred to by the reference number 10.

Referring to FIG. 1, a particularly preferred embodiment of the present invention is illustrated and includes a base 12 to which a base anchor 14 is affixed, extending upwardly therefrom. A post 16 attaches to the base 12 by sliding downwardly over the base anchor 14, and unattaches by sliding upwardly and off the base anchor 14. The base anchor 14 is generally polygonal in cross-section, and an inner diameter of the post 16 is such that the post fits snugly over the base anchor 14, thereby frictionally securing the post 16 to the base anchor 14 and maintaining the post in a vertical position. If desired, the post may also be permanently affixed to the base anchor by nails, screws, glue, or other methods.

A plug 20 fits into a top end of the post 16. In the preferred embodiment, the plug 20 is not removable from the post 16, but is permanently affixed thereto, generally with nails or screws. The plug 20 functions as an endcap to the post 16 and has a strip of hook-and-loop tape 28 affixed to a top face thereof.

A flexible post cover 22 is made of a cat-scratchable material, such as carpet or another pile-type material, and substantially covers the entire post 16 and plug 20. The post cover 22 wraps around a circumference of the post 16. A strip of hook-and-loop tape 18 affixed longitudinally to the post 16 attaches to two strips of hook-and-loop tape 36 affixed to vertical edges on a non-scratchable side of the post cover 22. The two strips of tape 36 each attach to approximately half the strip of tape 18 affixed to the post 16, meeting in the middle thereof. A top edge of the post cover 22 has triangular teeth 30 and grooves 32. The teeth 30 have hook-and-loop tape 34 affixed thereto, and when folded over the top of the post 16, the tape 34 attaches to the tape 28 affixed to the plug 20. The shapes of the teeth 30 and grooves 32 allow the post cover 22 to fold over the top of the post 16, substantially covering the plug 20 and leaving no gaps.

Figure 2:
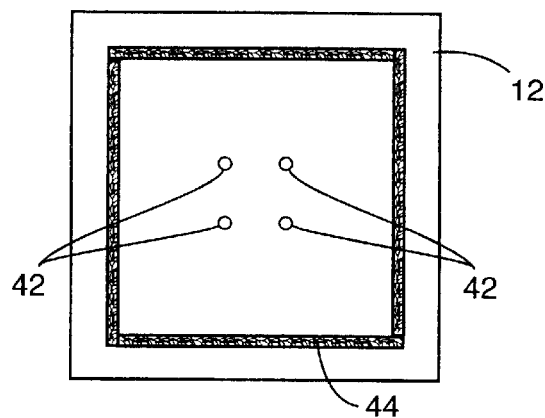
FIG. 2 is a bottom view taken generally along line 2—2 of FIG. 1, showing the base, hook-and-loop tape affixed thereto, and holes for base anchor screws.
Figure 3:
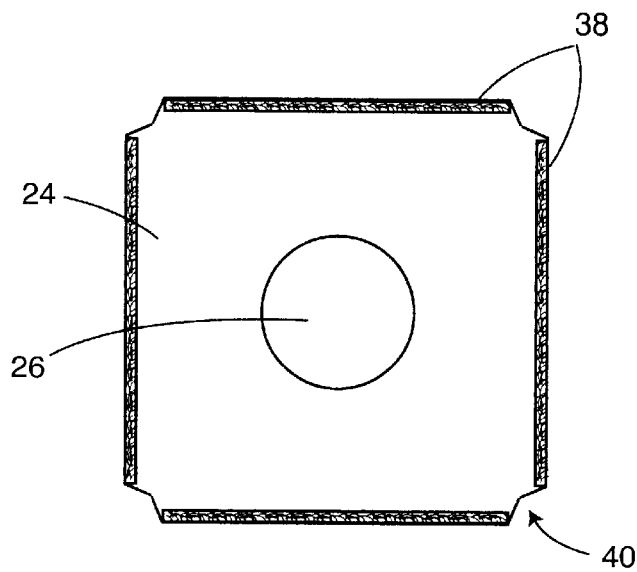
FIG. 3 is a bottom view taken generally along line 3—3 of FIG. 1, showing the base cover, a hole therein, and affixed hook-and-loop tape.

Referring now to FIGS. 1–3, generally, a flexible base cover 24, made of a cat-scratchable material, substantially covers the base 12. FIG. 2 illustrates a strip of hook-and-loop tape 44 affixed along a perimeter of an underside of the base 12. FIG. 3 illustrates strips of hook-and-loop tape 38 affixed along edges of a non-scratchable side of the base cover 24. As illustrated in FIG. 1, the base cover lays down flat on a top face of the base 12 and wraps around sides of the base, attaching to the underside of the base 12. The hook-and-loop tape 38 affixed to the base cover 24 attaches to the hook-and-loop tape 44 affixed to the underside of the base 12.

FIG. 2 illustrates a plurality of holes 42 in the base 12. The holes 42 pass completely through the base 12, and facilitate affixing the base anchor 14 to the base 12 as will be described hereinbelow.

FIG. 3 illustrates a general shape of the base cover 24 in the preferred embodiment. Notches 40 allow the base cover 24 to wrap around the sides of the base 12, and a hole 26 in the base cover 24 allows the post 16 to extend therethrough when the base cover 24 is in place.

Figure 4:
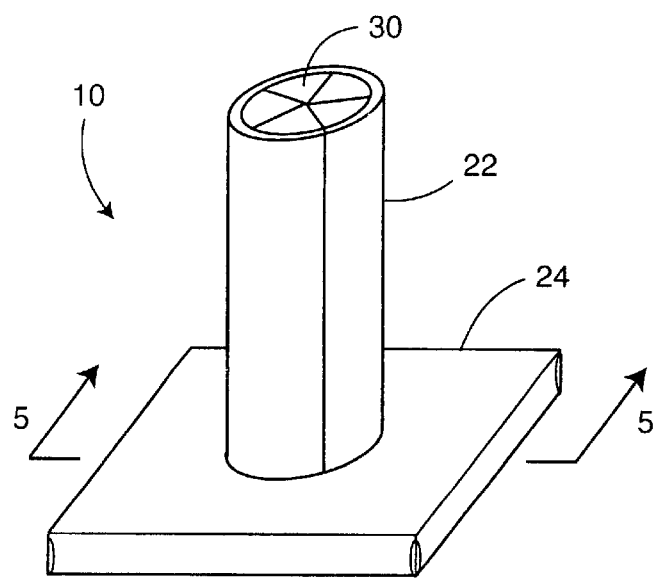
FIG. 4 is a perspective view of the fully assembled present invention, showing the post attached to the base, both covered by the cat-scratchable covers.

Referring now to FIG. 4, the preferred embodiment of the present invention is shown as it appears when fully assembled. Cat-scratchable covers 22, 24 substantially cover the base and post. Also illustrated is the manner in which the teeth 30 of the post cover 22 fold over and cover the top of the post, fitting together with no gaps thereinbetween.

Figure 5:
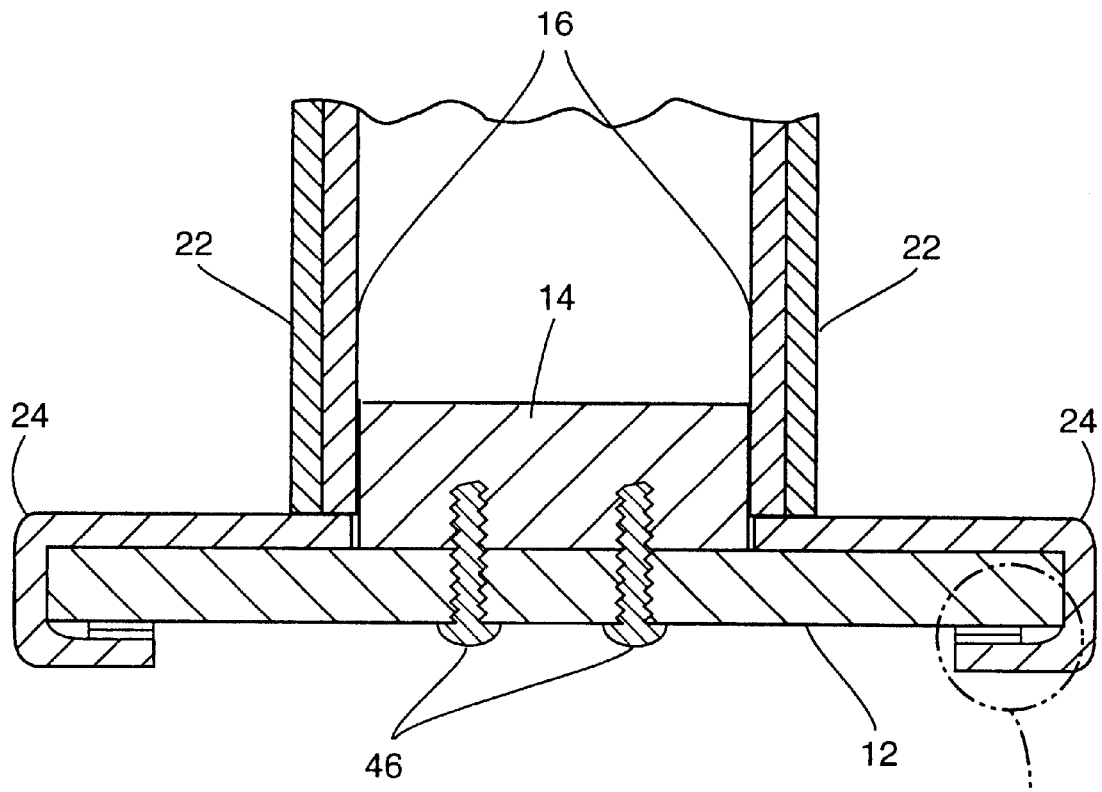
FIG. 5 is a cross-sectional view taken generally along line 5—5 of FIG. 4, showing the post slidably attached to the base anchor, which is attached to the base with screws, and base and post covers in place.
Figure 6:
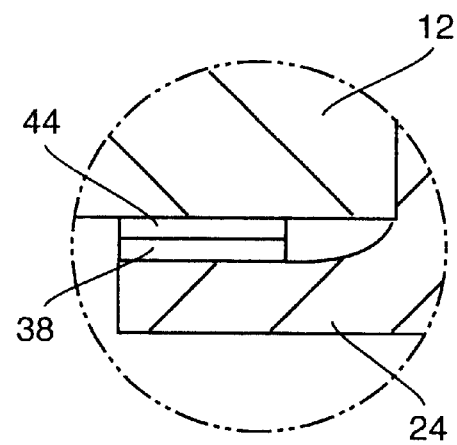
FIG. 6 is an enlarged cross-sectional view of area "6" of FIG. 5, illustrating a connection of the base cover to the base.

FIG. 5 illustrates more clearly the manner of attaching the base cover 24 to the base 12. As described hereinabove, the base cover 24 wraps around the sides of and underneath the base 12. The hook-and-loop tape 44 affixed to the underside of the base attaches to the hook-and-loop tape 38 affixed to the base cover. Also shown is the manner of affixing the base anchor 14 to the base 12. Screws 46 extend upwardly through the underside of the base 12 and into the base anchor 14, thereby securely affixing the base anchor to the base. As described hereinabove, the post 16 slides down over the base anchor 14, and the post cover 22 wraps around the post.

FIG. 4 illustrates the present invention as it appears when fully assembled and ready to be scratched by cats. In use, cats scratch the covers 22, 24 until the covers become worn out, necessitating replacement. At this point, traditional cat-scratching posts are discarded in their entirety, and the advantages of the present invention become apparent. When the covers 22, 24 reach the end of their useful lives, they are simply replaced with new covers 22, 24. Referring to FIG. 1, replacement is accomplished by first sliding the post 16 and attached post cover 22 upwardly and off the base anchor 14. The post cover 22 is then removed from the post 16 by peeling away the teeth 30 and the edges to which the hook-and-loop tape 36 is affixed. The worn post cover 22 is then discarded, and a new post cover is wrapped around and attached to the post 16 as a replacement.

Next, referring generally to FIGS. 1–3, edges of the base cover 24 are peeled away from the base 12, and the base cover 24 is discarded. A new base cover is then wrapped around and attached to the base as a replacement.

Finally, the post 16 and newly-attached post cover 22 are slid back down over the base anchor 14, thereby securing the post in a vertical position. At this point, the present invention is once again ready to be scratched by cats, as illustrated in FIG. 4.

It should be noted that only the post cover 22 and base cover 24 are periodically discarded and replaced. Unlike traditional cat-scratching apparatuses, the base and post of the present invention are continually reused.

Although an embodiment has been described in detail for purposes of illustration, various modifications may be made without departing from the scope and spirit of the invention. Accordingly, the invention is not to be limited, except as by the appended claims

What is claimed is:

1. A cat scratching apparatus, comprising:
   a base;
   a post extending upwardly from the base and removably attached thereto;
   a plug disposed within a top of the post;
   a post cover of cat-scratchable material removably attached to and substantially covering the posts;
   wherein the post cover includes teeth and grooves which interfit to substantially cover the top of the post and plug; and
   a base cover of cat-scratchable material removably attached to and substantially covering the base,
   wherein the base cover includes hook-and-loop tape for removably attaching to the base.

2. The apparatus of claim 1, including a base anchor extending upwardly from the base for slidably receiving the post.

3. The apparatus of claim 1, wherein the post cover includes hook-and-loop tape for removably attaching to the post.

4. The apparatus of claim 1, wherein the post is cylindrical in cross-section.

5. The apparatus of claim 1, wherein the base cover extends around sides of the base and is attached to an underside of the base.

6. A cat scratching apparatus comprising:
   a base;
   a base anchor extending upwardly from the base;
   a post which is cylindrical in cross-section, extending upwardly from the base anchor and attached thereto;
   a plug disposed within a top of the post;
   a post cover of cat-scratchable material removably attached to and substantially covering the post wherein the post cover includes teeth and grooves which interfit to substantially cover the top of the post and plug, and
   a base cover of cat-scratchable material removably attached to and substantially covering the base.

7. The apparatus of claim 6, wherein the post is removable from the base.

8. The apparatus of claim 6, wherein the post cover includes hook-and-loop tape for removably attaching to the post.

9. The apparatus of claim 6, wherein the base cover includes hook-and-loop tape for removably attaching to the base.

10. The apparatus of claim 6, wherein the base cover extends around sides of the base and is attached to an underside of the base.

11. A cat scratching apparatus comprising:

a base;

a base anchor extending upwardly from the base;

a cylindrical post extending upwardly from the base anchor and removably attached thereto;

a plug disposed within a top of the post;

a post cover of cat-scratchable material removably attached to and substantially covering the post, having interfitting teeth and grooves that substantially cover the top of the post and plug;

a base cover of cat-scratchable material removably attached to and substantially covering the base, extending around sides of the base and attachable to an underside of the base.

12. The apparatus of claim 11, wherein the post cover includes hook-and-loop tape for removably attaching to the post.

13. The apparatus of claim 11, wherein the base cover includes hook-and-loop tape for removably attaching to the base.

14. A cat scratching apparatus comprising:

a base;

a post extending upwardly from the base and removably attached thereto;

a plug disposed within a top of the post; and a post cover of cat-scratchable material removably covering the post, wherein the post cover includes teeth and grooves which interfit to substantially cover the top of the post and plug.

15. The apparatus of claim 14, including a base cover of cat-scratchable material removably covering the base.

16. The apparatus of claim 15, wherein the base cover includes hook-and-loop tape for removably attaching to the base.

17. The apparatus of claim 14, including a base anchor extending upwardly from the base for slidably receiving the post.

18. The apparatus of claim 14, wherein the post cover includes hook-and-loop tape for removably attaching to the post.

* * * * *